(12) United States Patent
Jouppi

(10) Patent No.: US 6,889,120 B2
(45) Date of Patent: May 3, 2005

(54) MUTUALLY-IMMERSIVE MOBILE TELEPRESENCE WITH GAZE AND EYE CONTACT PRESERVATION

(75) Inventor: Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 10/319,911

(22) Filed: Dec. 14, 2002

(65) Prior Publication Data

US 2004/0117067 A1 Jun. 17, 2004

(51) Int. Cl.[7] .......................... G05B 15/00; G05B 19/00
(52) U.S. Cl. ...................... 700/259; 700/245; 700/246; 700/250; 700/251; 700/257; 700/258; 700/259; 700/262; 348/159; 982/103
(58) Field of Search ................................. 700/245, 246, 700/250, 251, 253, 257–259, 262; 348/159; 382/103

(56) References Cited

U.S. PATENT DOCUMENTS

| | | | |
|---|---|---|---|
| 6,292,713 B1 | | 9/2001 | Jouppi et al. |
| 6,666,374 B1 | * | 12/2003 | Green et al. ................ 235/379 |
| 6,726,096 B1 | * | 4/2004 | Green et al. ................ 235/379 |
| 6,726,476 B2 | * | 4/2004 | Jung et al. .................... 433/26 |
| 6,727,935 B1 | * | 4/2004 | Allen et al. .............. 348/14.03 |
| 6,785,402 B2 | * | 8/2004 | Jouppi et al. ............... 382/103 |
| 2002/0057279 A1 | * | 5/2002 | Jouppi ........................ 345/619 |
| 2002/0063726 A1 | * | 5/2002 | Jouppi ........................ 345/660 |
| 2002/0118861 A1 | * | 8/2002 | Jouppi et al. ............... 382/103 |
| 2002/0173877 A1 | * | 11/2002 | Zweig ......................... 700/245 |
| 2003/0209893 A1 | * | 11/2003 | Breed et al. ................ 280/735 |
| 2004/0008423 A1 | * | 1/2004 | Driscoll et al. ............. 359/725 |
| 2004/0027451 A1 | * | 2/2004 | Baker ........................... 348/46 |
| 2004/0088077 A1 | * | 5/2004 | Jouppi et al. ............... 700/245 |
| 2004/0088078 A1 | * | 5/2004 | Jouppi et al. ............... 700/245 |
| 2004/0117067 A1 | * | 6/2004 | Jouppi ........................ 700/245 |

OTHER PUBLICATIONS

Jouppi, First steps towards mutually–immersive mobile telepresence, 2002, Internet, pp. 1–10.*
Kusuoka et al., Dual ecologies of robot as communication media: Thoughts on coordinating orientations and projectability, 2004, Internet, pp. 183–190.*
Jouppi et al., A first generation mutually–immersive mobile telepresence surrogate with automatic backtracking, 2004, IEEE, pp. 1670–1675.*
HP Labs: News, BiReality Audio–Video Demo, First steps toward a mutually immersive mobile telepresence, 2002, Internet, pp. 1–2.*
Braunl et al., Improv and EyeBot real–time vision on–board mobile robots, 1997, IEEE, pp. 131–135.*
Lobo et al., Integration of inertial information with vision towards robot autonomy, 1997, IEEE, pp. 825–830.*
U.S. Appl. No. 10/285,757, Jouppi et al.
U.S. Appl. No. 10/285,726, Jouppi et al.

* cited by examiner

*Primary Examiner*—Thomas G. Black
*Assistant Examiner*—McDieunel Marc

(57) ABSTRACT

A method and system are provided for user and participant telepresencing including viewing a user from a plurality of views to obtain an image of a user, communicating the image of the user to a surrogate, and displaying the image of the user on the surrogate with eye contact between the user and the participant preserved.

23 Claims, 5 Drawing Sheets

MUTUALLY-IMMERSIVE MOBILE TELEPRESENCE WITH GAZE AND EYE CONTACT PRESERVATION

CROSS-REFERENCE TO RELATED APPLICATIONS

The present application contains subject matter related to copending U.S. patent application Ser. No. 10/285,757 filed Oct. 31, 2002, by Norman Paul Jouppi and Vaughan Stanton Thomas entitled "Telepresence System with Automatic User-Surrogate Height Matching". The related application is assigned to Hewlett-Packard Development Company, L.P. and is incorporated herein by reference thereto.

The present application also contains subject matter related to copending U.S. patent application Ser. No. 10/285,726 filed Oct. 31, 2002, by Norman Paul Jouppi and Vaughan Stanton Thomas entitled "Mutually-Immersive Mobile Telepresence System with User Rotation and Surrogate Translation". The related application is assigned to Hewlett-Packard Development Company, L.P. and is incorporated herein by reference thereto.

BACKGROUND

1. Technical Field

The present invention relates generally to robotics and more specifically to telepresence systems.

2. Background Art

In the past, video camera and audio systems were developed for improving communication among individuals who are separated by distance and/or time. The systems and the process are now referred to as "videoconferencing". Videoconferencing sought to duplicate, to the maximum extent possible, the full range, level and intensity of interpersonal communication and information sharing which would occur if all the participants of a meeting were "face-to-face" in the same room at the same time.

In addition to spoken words, demonstrative gestures, and behavioral cues, face-to-face contact often involves sitting down, standing up, and moving around to look at objects or people. This combination of spoken words, gestures, visual cues, and physical movement significantly enhances the effectiveness of communication in a variety of contexts, such as "brainstorming" sessions among professionals in a particular field, consultations between one or more experts and one or more clients, sensitive business or political negotiations, and the like.

Behavioral scientists know that interpersonal communication involves a large number of subtle and complex visual cues, referred to by names like "gaze" and "eye contact," which provide additional information over and above the spoken words and explicit gestures. Gaze relates to others being able to see where a person is looking and eye contact relates to the gazes of two persons being directed at the eyes of the other. These cues are, for the most part, processed subconsciously by the people, and often communicate vital information.

In situations where all the people cannot be in the same place at the same time, the beneficial effects of face-to-face contact will be realized only to the extent that a remotely located person, or "user", can be "recreated" at the site of the meeting where the "participants" are present.

In robotic telepresence, a remotely controlled robot simulates the presence of the user. The overall experience for the user and the participants interacting with the robotic telepresence device is similar to videoconferencing, except that the user has a freedom of motion and control over the robot and video input that is not present in traditional videoconferencing. The robot platform typically includes a camera, a display device, a motorized platform that includes batteries, a control computer, and a wireless computer network connection. An image of the user is captured by a camera at the user's location and displayed on the robotic telepresence device's display at the meeting.

In one previous approach, a robotic device was built on a remote controlled chassis. The robotic device used a single small camera with a relatively small field of view and low resolution. This device shared problems with videoconferencing in that the user had "tunnel vision." The user was not provided with a peripheral view of the environment as compared to human peripheral vision. In addition, the central resolution of the remote camera was much lower than that of the human eye, which made it difficult to remotely read anything other than very large text.

The robotic device displayed the user's image on a small LCD screen about three inches tall, which did not move independently of the robotic platform. This display did not preserve gaze or eye contact between the user and the participants interacting with the remote user via the robot. This made it difficult for meeting participants to relate naturally to the user of the robotic device.

In the past, eye contact has been preserved over only a small field of view (roughly 25 degrees) by the use of a "reciprocal video tunnel". This system places a half-silvered mirror in front of a monitor, so that a camera can capture the view of a user sitting in front of the monitor. Two users sitting in front of such monitors at different locations can then make eye contact with each other. Unfortunately this design is not scalable to implementations covering larger fields of view or to preserve gaze. Also, the use of a half-silvered mirror in front of the monitor results in reduced contrast for images from the meeting location, as well as spurious reflections from the user's own location.

Furthermore, since there are only two participants using the system, it is obvious to whom each user is speaking, so many of the benefits of eye contact are not needed. Eye contact is much more important when more than two participants interact with each other, since eye contact in particular can be used for selecting participants and signifying attention.

Numerous other approaches since the reciprocal video tunnel have tried to preserve gaze and eye contact while using desktop videoconferencing systems. Again, all this work solves a problem of relatively lower interest, since the field of view is so small and there are so few participants to direct eye contact to (e.g., one or a most a few).

Gaze is very important in human interactions. It lets a person know that other participants are paying attention to a person, a presentation, a meeting, etc. It can be also used to arbitrate taking of turns in conversations. Gaze is not preserved in prior commercial videoconferencing systems, and this significantly reduces their usefulness.

Solutions to problems of this sort have been long sought, but have long eluded those skilled in the art.

DISCLOSURE OF THE INVENTION

The present invention provides a method and system for user and participant telepresencing including viewing a user from a plurality of views to obtain images of a user, communicating the images of the user to a surrogate, and displaying the images of the user on the surrogate with gaze as well as eye contact between the user and the participant preserved.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

The present invention relates to a Mutually-Immersive Mobile Telepresence (E-Travel) System. A user sits in a room showing the remote meeting location and a robot device is located at a remote meeting location. Video and audio are transmitted between the display and the robot device so that the user has the feeling of being present at the remote location by seeing it in a surround view, and the people or meeting participants at the remote location have the feeling that the user is present by panels showing images of the head of the user; i.e., the feeling of telepresence. The robot device may have a humanoid as well as a non-humanoid shape, and is referred to as a "surrogate".

For example, the user sits or stands inside a display cube, with rear-projection surfaces on the front, back, sides, and optionally the ceiling showing images of the surrogate's location. Since the goal is to be mutually immersive, full-size live color video images of the user centered on the user's head are acquired from all four sides of the user's location for transmission to the surrogate's location concurrent with projection of full-size live color video surround from the surrogate's location on the four sides of the display cube surrounding the user. The user can move about inside the display cube, so head tracking techniques are used to acquire pleasingly cropped color video images of the user's head in real time.

Key components of telepresence of the present invention are preserving gaze and eye contact, which are very important in human interactions.

In "preserving gaze", the gaze of a user looking at an object displayed in the display cube will appear, to the participant looking at the image of the user, to be a gaze directed to the actual object in the meeting room. It lets the participant know that the user is paying attention to a person, a presentation, etc. in a meeting.

In "preserving eye contact", the gaze of a user looking at the eyes of the participant displayed in the display cube will, appear to the participant gazing at the image of the eyes of the user on the surrogate's displays, to be a gaze directed at the participant's eyes. It lets the participant know that the user is paying attention to the participant. It can be also used to arbitrate taking of turns in conversations.

Another key component of having a telepresence in a surrogate's location is that the user can have a full 360-degree field of view of the surrogate's location without turning the surrogate's head or body when the user turns the user's head and body. For example, in a business meeting a user can turn to look at participants around or even behind the surrogate without having to turn the surrogate. This capability is non-existent in prior videoconferencing systems.

Figure 1A:
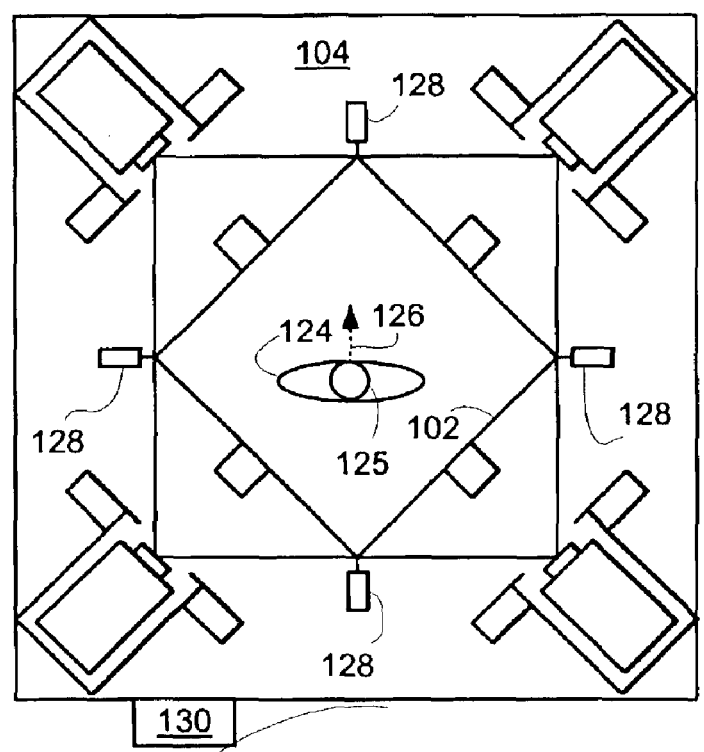
FIGS. 1A and 1B show a Mutually-Immersive Mobile Telepresence (E-Travel) System.
Figure 1A:
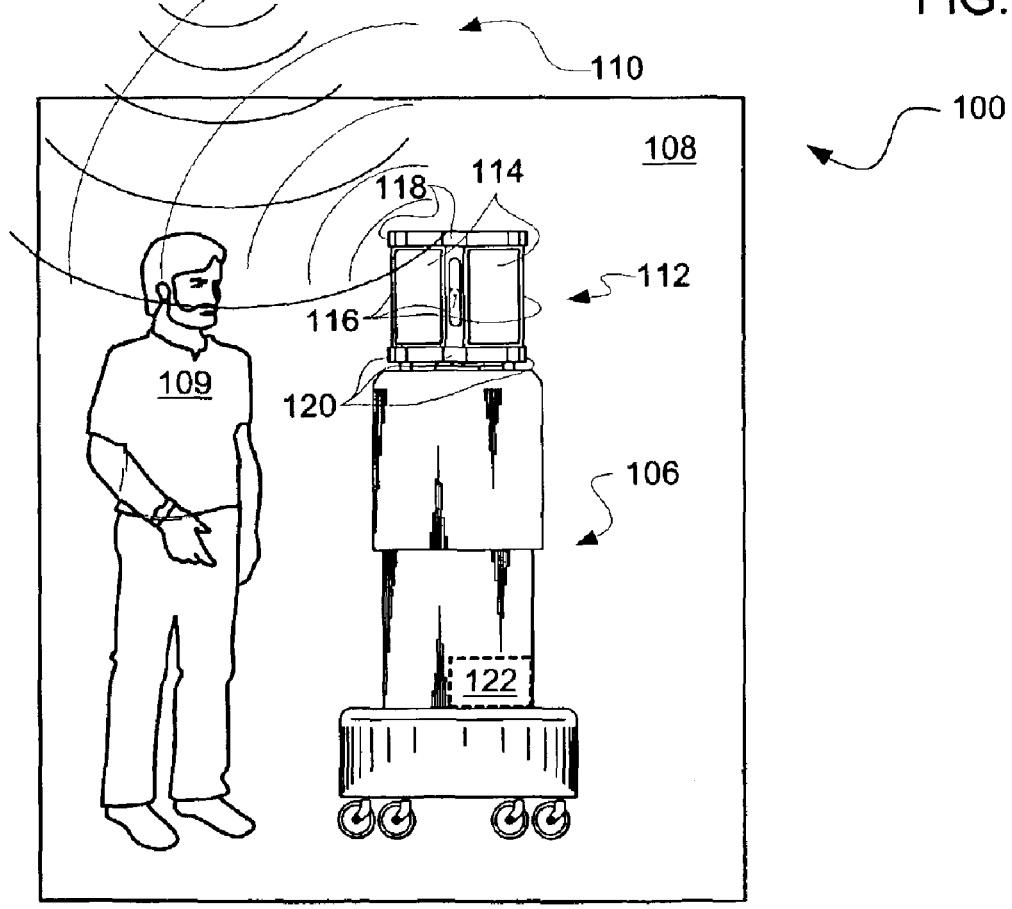
Figure 1B:
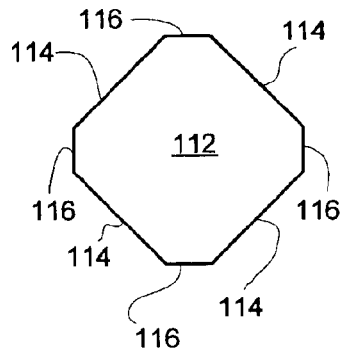

Referring now to FIGS. 1A and 1B, therein are shown a Mutually-Immersive Mobile Telepresence (E-Travel) System 100, which includes a display cube 102 at a user's location 104 and a surrogate 106 at a remote location, a surrogate's location 108, where a meeting with one or more participants, such as a participant 109, is occurring. The surrogate 106 is connected to the display cube 102 via a high-speed communication network 110.

The surrogate 106 has a surrogate's head 112 including a number of surrogate's displays, such as four LCD panels, which make up a surrogate's displays 114. The surrogate's displays 114 are generally rectangular and have a center level midway up the displays.

One or more cameras, such as four surrogate's cameras 116, are positioned in the corners of the surrogate's head 112 horizontally level with the center level of the surrogate's displays 114. The surrogate's cameras 116 are at about eye level and to view and capture a 360 degrees surround live video outwardly from the surrogate 106 at the surrogate's location 108 for display on the display cube 102.

One or more microphones, such as four directional surrogate's microphones 118, are positioned in the top corners of the surrogate's head 112 to capture sounds 360 degrees around the surrogate 106. One or more speakers, such as the four surrogate's speakers 120 are positioned in the bottom corners of the surrogate's head 112 to provide directional audio of the user's voice.

The surrogate 106 contains surrogate's computer/transceiver systems 122 for connecting to the surrogate's cameras 116 and the surrogate's microphones 118, processing data, and sending it to a user 124 in the display cube 102. The surrogate's computer/transceiver systems 122 also receive a live video view of the user's head 125, facing in a direction 126, from user's camera arrays 128 at the four corners of the display cube 102. The live video view is a 360 degrees view of the user's head 125. The four images of the user's head 125 are displayed on the surrogate's displays 114 in the surrogate's head 112 with the user's image facing in the direction 126.

The surrogate's computer/transceiver systems 122 also receive audio signals from the user 124, process them, and output them to the surrogate's speakers 120.

The surrogate 106 may be pushed around to different positions at the surrogate's location 108 or may be remotely controlled for movement by the user 124. The video from the surrogate's cameras 116 in the surrogate's head 112 are compressed and transmitted over the high-speed communication network 110 to user's computer/transceiver systems 130 at the user's location 104.

Figure 2:
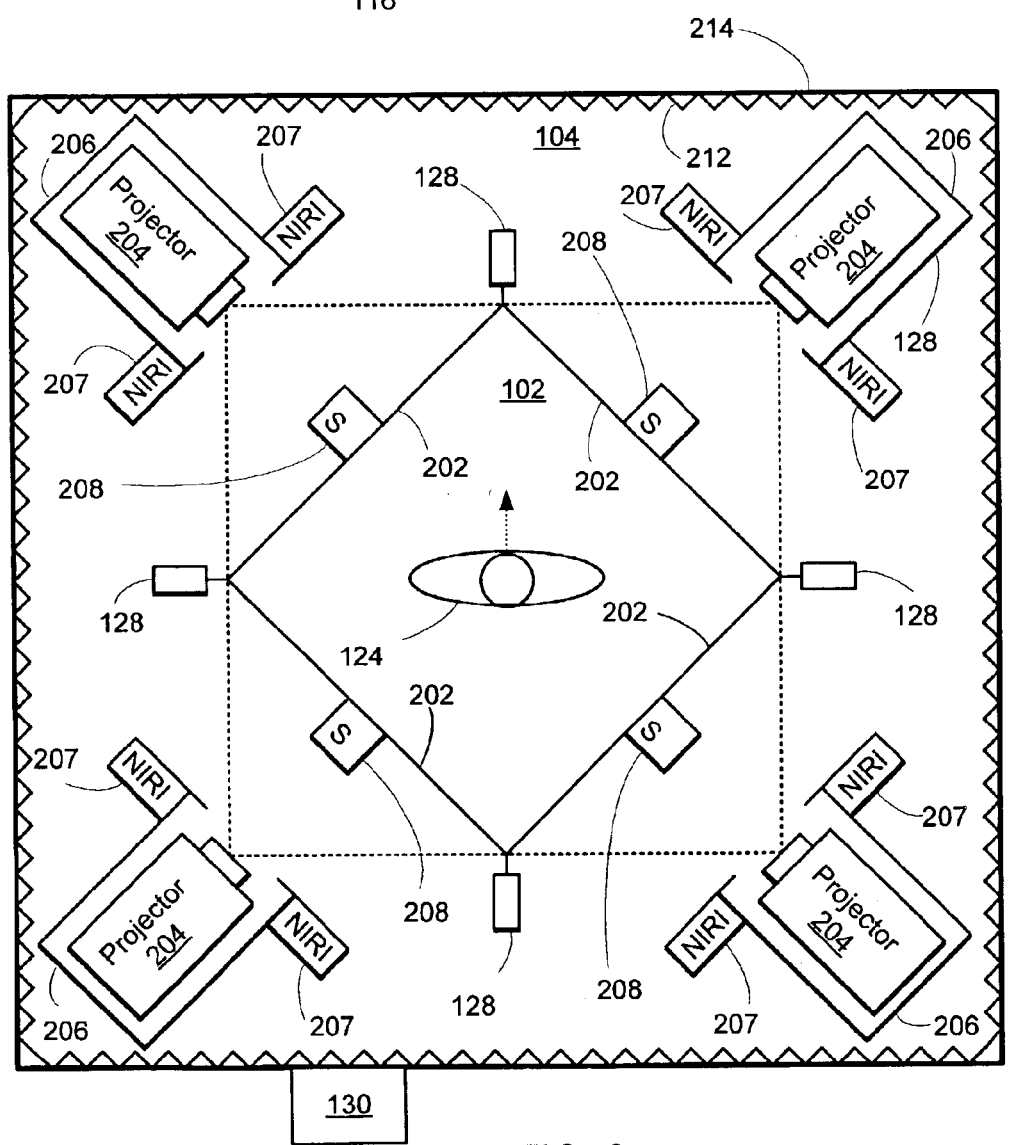
FIG. 2 shows a display cube at a user's location.

Referring now to FIG. 2, therein is shown the display cube 102 at the user's location 104. The video view from the surrogate's cameras 116 (of FIG. 1) in the surrogate's head 112 is displayed on the walls of the display cube 102. In one embodiment, the display is by way of a back projection onto projection screens 202 of the display cube 102 by four user's projectors 204. Where the participant 109 (of FIG. 1) is directly in front of one of the surrogate's displays 114, the image of the participant 109 will be projected in the corners of two of the projection screens 202.

The user's projectors 204 are housed in "hush boxes 206" to make them virtually inaudible. The hush boxes 206 are built using sound isolation techniques familiar to those skilled in the state of the art. Each of the hush boxes 206 has a double-pane window for the projector light beam to shine out of the hush box 206 and onto the projection screen 202. Each of the hush boxes 206 also has measures for adequately cooling the user's projectors 204.

Adjacent the hush boxes 206 are near-infrared illuminators (NIRIs) 207 for providing light in the near-infrared portion of the spectrum for near-infrared cameras in the user's camera arrays 128.

User's speakers 208 are mounted above and below each projection screen 202. By driving each pair of speakers 208 with equal volume signals the sound appears to come from the center of each of the projection screens 202 to provide directional audio or hearing of one or more participants 109 from the four surrogate's microphones 118 on the surrogate 106.

The user's computer/transceiver systems 130, which can be placed in an adjacent room (for sound isolation purposes), drive the user's speakers 208 with audio information transmitted from the surrogate 106 at the surrogate's location 108. Anechoic foams 212 are (optionally) placed on walls 214 of the user's location 104. The anechoic foams 212 eliminate local reflections and permit the ambiance of the surrogate's location 108 to be recreated. Furthermore, by using black anechoic foams 212, stray reflection of light is reduced and the contrast on the projection screens 202 is increased.

The images of the meeting room on the projection screens 202 in the display cube 102 are presented "life size". This means that the angle subtended by objects on the projection screens 202 is roughly the same angle as if the user 124 were actually at the surrogate's location 108 viewing it personally. However, it will be understood that the reproduction is not exact unless the user's head is centered in the display cube 102. However, the present invention is still an improvement since images are not presented at "life size" in conventional videoconferencing systems.

As would be evident from the above disclosure, images on the projection screens 202 must be presented at life size in order for eye contact to be accurately preserved at more than one point. For example, if images are not presented at life size, a movement of the user's eyes by X degrees to the left will not be directed at objects X degrees to the left at the surrogate's location 108, for a given value of X (e.g., 30 degrees).

In the above, the display cube 102 has four sides so there are four surrogate's displays 114. If the display is not a cube but has fewer or more sides, there will be a number of surrogate's displays equal to the number of sides.

Figure 3:
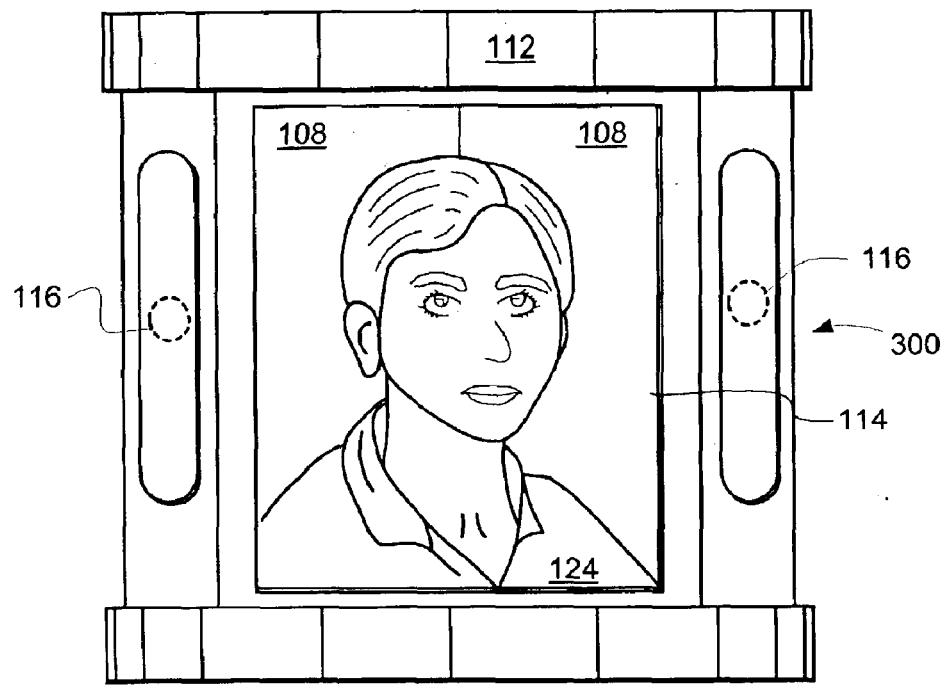
FIG. 3 shows an example of preserving horizontal gaze.

Referring now to FIG. 3, therein is shown an example 300 of preserving horizontal gaze and eye contact between the user 124 and the participant 109 (of FIG. 1) on one of the surrogate's displays 114.

If the user 124 looks almost directly into a corner of the display cube 102, the user 124 is looking almost straight into one of the user's camera arrays 128 (shown in FIG. 1) and the image of the user's head 125 will appear almost face on in one of the surrogate's displays 114. The user's eyes will appear to be gazing almost directly out of the surrogate's displays 114.

If the participant 109 is looking at the surrogate's displays 114 and is standing almost directly in front of one of the surrogate's displays 114, the participant 109 will be viewed by two of the surrogate's cameras 116 on either side of the one of the surrogate's displays 114 and the participant's image will be transmitted for projection at the corner of the projection screens 202, where the user 124 is looking. The projection will make the image of the participant 109 appear to be looking out of the corner of the projection screens 202.

Since the gaze of the user 124 is on the image of the participant 109 on the projection screens 202 and the gaze of the participant 109 is on the image of the user 124 on the surrogate's displays 114, when the gaze of one falls on the eyes of the other, horizontal eye contact will occur and can be preserved.

As would be evident from the above, as the participant 109 moves around the surrogate 106, the user 124 can turn his/her head to follow and the user's images on the surrogate's displays 114 will appear to turn so as to preserve eye contact.

Similarly, if the user 124 looks at an object anywhere, the participant 109 can see where the user 124 is gazing and determine the object being gazed upon. Naturally, this would also be true if the participant 109 looks at an object anywhere. Thus, the System 100 preserves gaze.

It should be noted that the projection screens 202 (of FIG. 2) behind the user 124 show the part of the surrogate's location 108 behind the surrogate 106. This part of the background is visible behind the user's head 125, just as it would be if the user 124 were actually physically present at the surrogate's location 108.

Figure 4:
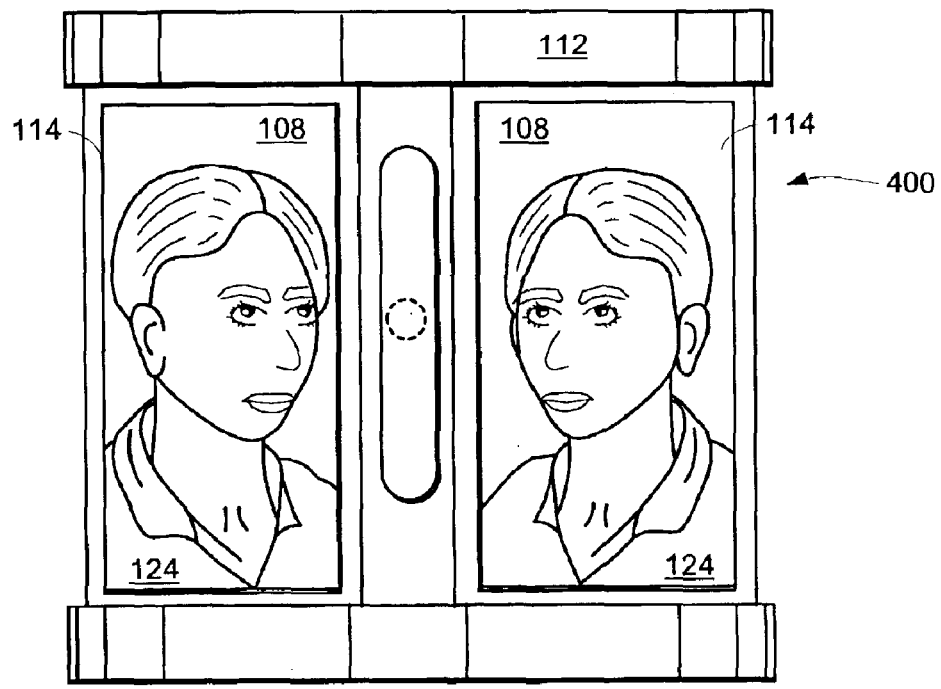
FIG. 4 shows another example of preserving horizontal gaze.

Referring now to FIG. 4, therein is shown another example 400 of preserving horizontal eye contact between the user 124 and the participant 109 (of FIG. 1) on two of the surrogate's displays 114.

If the user 124 is looking at the center of one of the projection screens 202 (of FIG. 2), because the participant 109 is off to one side, the participant 109 will be viewed by one of the corner surrogate's cameras 116. This makes good eye contact between them from the user's perspective, but the participant 109 actually sees the user 124 on two of the surrogate's displays 114. The user's image on each of the surrogate's displays 114 appears to be looking towards the participant 109.

Again, it should be noted that the projection screens 202 (of FIG. 2) behind the user 124 show the part of the surrogate's location 108 behind the surrogate 106.

If the user 124 is looking somewhere between the center and the corner of the projection screen 202 (of FIG. 2), the result will be between the two cases of FIGS. 3 and 4.

Figure 5B:
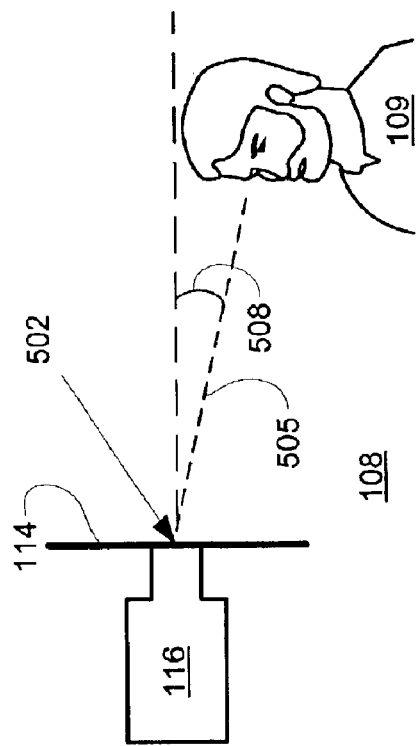
FIGS. 5A and 5B show an example of preserving vertical gaze.
Figure 5A:
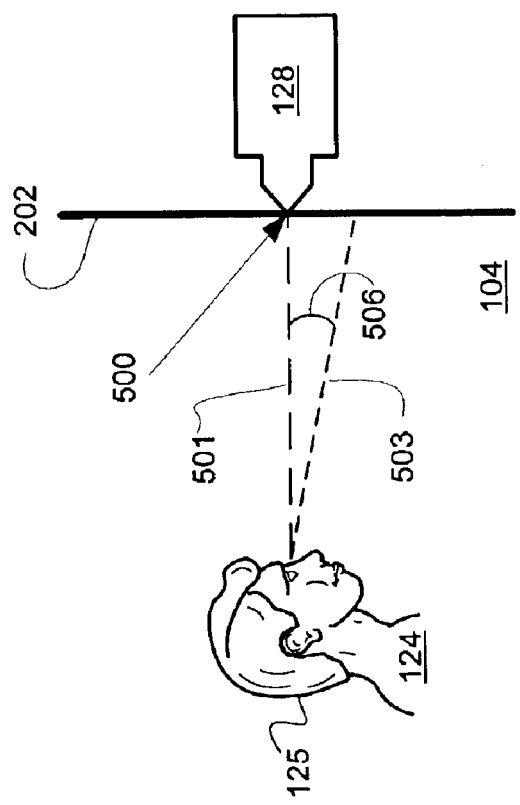

Referring now to FIGS. 5A and 5B, therein are shown an example of preserving vertical eye contact. FIG. 5A shows the user's location 104 and the user 124 while the FIG. 5B shows the surrogate's location 108 and the participant 109.

It has been discovered that in order to preserve the user's and the participant's vertical component of gaze to maintain eye contact, the surrogate's camera 116 has to be at the same vertical level of the user's eyes displayed on the surrogate's displays 114.

Thus, the user's eyes should be at a level 501 with the user's camera 116 (assuming a generally seated user 124). This will display the user's eyes on the surrogate's displays 114 at a center level 502. As a result, the angle 506 of the user 124 looking down along a gaze 503 at the image of the participant's eyes on the projection screen 202 is the same as angle 508 of the image of the user 124 looking down along a gaze 505. Similarly, the vertical component of gaze of the participant 109 looking at the image of the user's eyes displayed on the surrogate's displays 114 will be preserved as though the participant 109 is gazing back along the gaze 505 and the gaze 503 to the eyes of the user 124.

The previous example assumes that the surrogate's camera 116 is oriented so that it is parallel to the ground, so the resulting video view is centered about the horizon. It also assumes the projected view of the surrogate's location 108 is parallel to the ground and roughly centered about the user's eye level.

Figure 6:
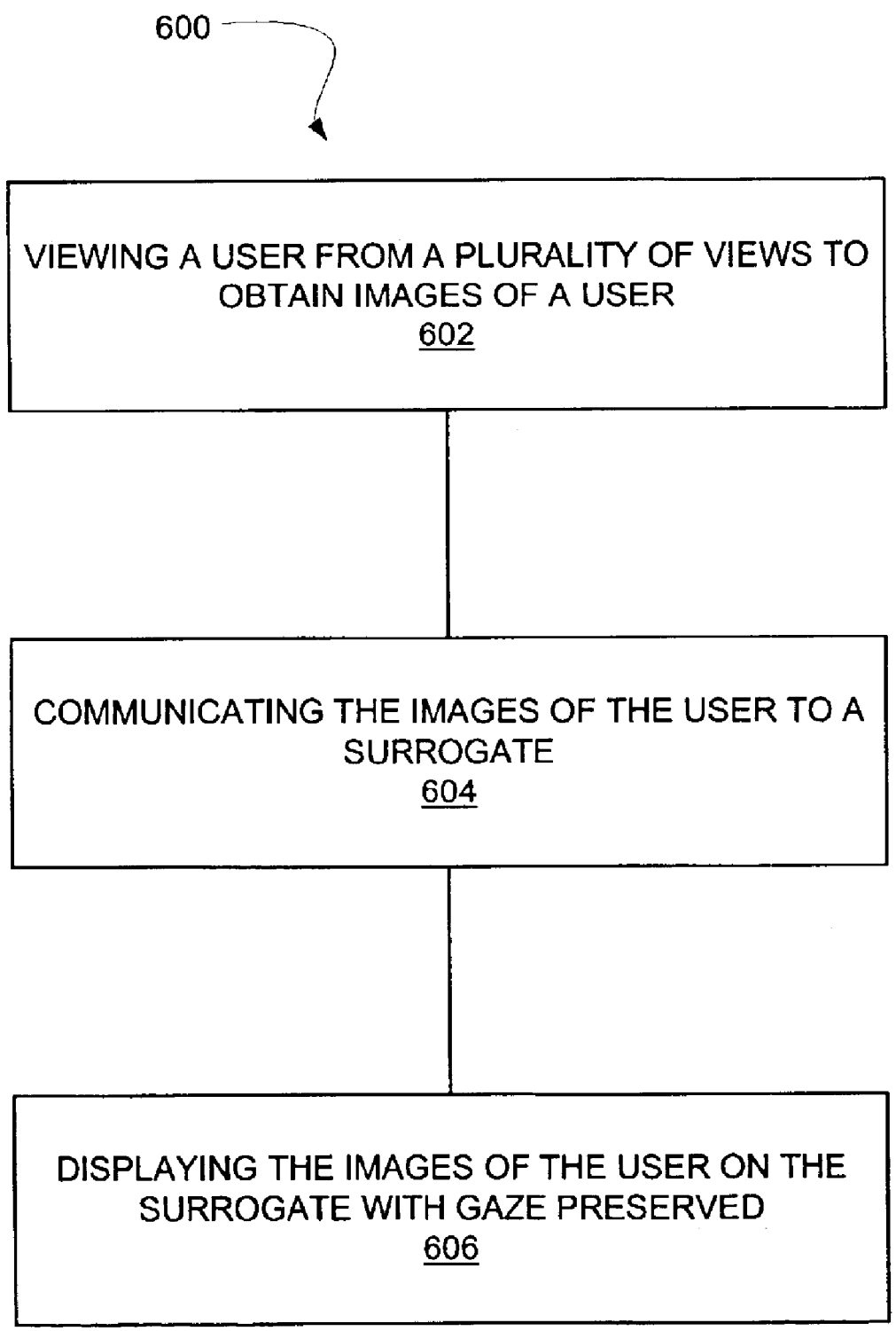
FIG. 6 shows a telepresencing method in accordance with the present invention.

Referring now to FIG. 6, therein is shown a method 600 in accordance with the present invention. The method 600 includes: a block 602 of viewing a user from a plurality of views to obtain images of a user, a block 604 of communicating the images of the user to a surrogate, and a block 606 of displaying the images of the user on the surrogate with gaze preserved.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method for user and participant telepresencing comprising:
    viewing the user from a plurality of views to obtain a plurality of user's images;
    communicating the plurality of user's images to a surrogate; and
    displaying the plurality of user's images on surrogate's displays with gaze of the user preserved.

2. The method of telepresencing as claimed in claim 1 additionally comprising:
    viewing the participant from the surrogate from at least one of a plurality of views to obtain at least one participant's image;
    communicating the at least one participant's image to a user's display; and
    displaying the at least one participant's image on the user's display with gaze of the participant preserved.

3. The method of telepresencing as claimed in claim 1 wherein:
    viewing the user includes viewing from an user's eye level; and
    displaying the plurality of images on the surrogate's displays includes having the user's eye level proximate center levels of the surrogate's displays; and
    additionally comprising:
    viewing around the surrogate from views proximate the center levels of the surrogate's displays to create images of views around the surrogate;
    communicating the images of views around the surrogate; and
    displaying images of views around the surrogate to the user at the user's eye level on the user's displays.

4. The method of telepresencing as claimed in claim 1 wherein:
    viewing the user from a plurality of views uses a number of views; and
    displaying the plurality of user's images uses the same number of surrogate's displays as the number of views.

5. The method of telepresencing as claimed in claim 1 additionally comprising:
    viewing a plurality of views around the surrogate to create a plurality of images from the surrogate;
    communicating the plurality of images from the surrogate to a user's display;
    displaying the plurality of images from the surrogate on the user's display; and
    displaying the plurality of images from the surrogate on the user's display also on the surrogate's display.

6. The method of telepresencing as claimed in claim 1 additionally comprising:
    providing directional audio between the surrogate and the user.

7. A method of user and participant telepresencing comprising:
    viewing a user from a plurality of views to obtain images of a user from 360 degrees around the user;
    processing the images of the user to provide cropped video images of the user's head;
    communicating the cropped video images of the user's head to a surrogate; and
    displaying the cropped video images on surrogate's displays with horizontal gaze of the user preserved.

8. The method of telepresencing as claimed in claim 7 additionally comprising:
    viewing 360 degrees around the surrogate, the viewing including at least one view of the participant to obtain at least one participant's image; and
    communicating the at least one participant's image to a user's display cube; and
    displaying the at least one participant's image on the user's display cube with horizontal gaze of the participant preserved and user and participant proximate eye contact preserved.

9. The method of telepresencing as claimed in claim 7 wherein:
    viewing the user from a plurality of views uses a number of views;
    displaying the plurality of user's images uses the same number of surrogate's displays as the number of views; and
    viewing 360 degrees around the surrogate uses a plurality of surrogate views as the number of views.

10. The method of telepresencing as claimed in claim 7 wherein:
    viewing the user includes viewing from a first and second heights when the user changes between first and second heights; and
    additionally comprising;
    viewing the user at the first or the second height when the user is respectively at the first or second height.

11. The method of telepresencing as claimed in claim 7 additionally comprising:
    viewing a plurality of views 360 degrees around the surrogate to create a plurality of images from the surrogate;
    communicating the plurality of images from the surrogate to a user's display cube;
    displaying the plurality of images from the surrogate on the user's display cube; and
    displaying the plurality of images from the surrogate on the user's display cube behind the user on the surrogate's display.

12. The method of telepresencing as claimed in claim 7 additionally comprising.

viewing a plurality of views 360 degrees around the surrogate to create a plurality of images from the surrogate;

communicating the plurality of images from the surrogate to a user's display cube;

displaying the plurality of images life-size; and transmitting sounds from 360 degrees around the surrogate in directions corresponding to the plurality of views 360 degrees around the user's display cube.

13. A user and participant telepresence system comprising:

user's cameras for viewing the user from a plurality of views to obtain a plurality of user's images;

a communication system for communicating the plurality of images from the user's cameras; and a surrogate in communication with the communication system, the surrogate including surrogate's displays for displaying the plurality of images of the user with the gaze of the user preserved.

14. The user and participant telepresence system as claimed in claim 13 wherein:

the number of user's cameras equal the number of surrogate's displays.

15. The user and participant telepresence system as claimed in claim 13 wherein:

the user's cameras are positioned at an user's eye level; and the surrogate's displays display the plurality of images of the user with the user's eye level proximate center levels of the surrogate's displays; and additionally comprising:

surrogate's cameras proximate the center levels of the surrogate's displays to obtain images of views around the surrogate;

communicating the images of the views around the surrogate; and user's displays for displaying images of views around the surrogate to the user at the user's eye level.

16. The user and participant telepresence system as claimed in claim 13 wherein:

the user's cameras include further cameras for determining an eye level of the user; and the user's cameras at a height proximate the eye level of the user obtain the plurality of user's images.

17. The user and participant telepresence system as claimed in claim 13 additionally comprising:

a plurality of surrogate's cameras for obtaining an image of a participant, the plurality of surrogate's cameras view 360 degrees around the surrogate, surrogate's cameras positioned adjacent to the surrogate's displays for viewing a plurality of views around the surrogate to create a plurality of images from the surrogate;

a communication system for communicating the plurality of images from the surrogate;

user's displays in communication with the communication system, the users displays for displaying the plurality of images from the surrogate on the user's display; and wherein:

the surrogates displays display the plurality of images from the surrogate on the user's display also on the surrogate's displays.

18. The user and participant telepresence system as claimed in claim 13 additionally comprising:

a plurality of microphones and speakers on the surrogate and around the user to obtain directional audio between the user and the participant.

19. A user and participant telepresence system comprising:

user's cameras for viewing a user from a plurality of views to obtain images of a user from 360 degrees around the user;

a processing system for processing the images of the user to provide cropped video images of the user's head;

a communication system for communicating the cropped video images of the user's head; and a surrogate in communication with the communication system, the surrogate having surrogate's displays for displaying the cropped video image with horizontal gaze of the user preserved.

20. The user and participant telepresence system as claimed in claim 19 additionally comprising:

surrogate's cameras for viewing 360 degrees around the surrogate and including at least one view of the participant to obtain at least one participant's image; and a further communication system for communicating the at least one participant's image;

a user's display cube for displaying the at least one participant's image with the horizontal gaze of the participant preserved and user and participant proximate eye contact preserved.

21. The user and participant telepresence system as claimed in claim 19 wherein:

the number of user's cameras equal the number of surrogate's displays; and additionally comprising:

a plurality of surrogate's cameras, the number of surrogate's cameras equal the number of user's cameras.

22. The user and participant telepresence system as claimed in claim 19 additionally comprising:

surrogate's cameras for viewing a plurality of views 360 degrees around the surrogate to create a plurality of images from the surrogate;

a further communication system for communicating the plurality of images from the surrogate;

a user's display cube for displaying the plurality of images from the surrogate; and wherein:

the surrogate's displays display the plurality of images from the surrogate on the user's display cube behind the user on the surrogate's display.

23. The user and participant telepresence system as claimed in claim 19 additionally comprising:

surrogate's cameras for viewing a plurality of views 360 degrees around the surrogate to create a plurality of images from the surrogate;

microphones for receiving sounds from 360 degrees around the surrogate;

a further communication system for communicating the plurality of images and sounds from the surrogate;

a display cube for viewing the plurality of images and hearing the sounds from the surrogate in directions corresponding to the plurality of views 360 degrees around the user's display cube.

* * * * *